United States Patent [19]
Oakley

[11] Patent Number: 5,528,414
[45] Date of Patent: Jun. 18, 1996

[54] TWO DIMENSIONAL ELECTRO-OPTIC MODULATOR ARRAY

[75] Inventor: William S. Oakley, San Jose, Calif.

[73] Assignee: LOTS Technology, Santa Clara, Calif.

[21] Appl. No.: 238,644

[22] Filed: May 5, 1994

[51] Int. Cl.[6] .................................................. G02F 1/07
[52] U.S. Cl. ..................... 359/257; 359/254; 359/259
[58] Field of Search ................................ 359/245, 250, 359/254, 257, 276, 259, 279, 296; 385/8, 2

[56] References Cited

U.S. PATENT DOCUMENTS 5,260,719  11/1993  Maloney ........................... 346/107 R
5,317,446   5/1994  Mir et al. ............................ 359/296

*Primary Examiner*—Georgia Y. Epps
*Assistant Examiner*—Dawn-Marie Bey
*Attorney, Agent, or Firm*—Blakely, Sokoloff, Taylor & Zafman

[57] ABSTRACT

A two-dimensional modulator array for modulating a plurality of light beams. The modulator array is comprised of a plurality of stacked wafer layers. Each of the wafer layers have a linear array of transversely driven Pockels modulators. The Pockels modulators are formed by placing a plurality of electrodes over a top surface of an optical material and extending the electrodes over a beveled edge of the optical material. A ground plane resides on the bottom surface of the optical material. Conductive end reflectors are associated with each of the modulator electrodes. These end reflectors reflect the light beams back through the wafer. Electrical attachments are connected to the ends of each electrode for controlling the modulation for each electrode. Thereby, separate light beams can be individually modulated.

4 Claims, 4 Drawing Sheets

TWO DIMENSIONAL ELECTRO-OPTIC MODULATOR ARRAY

FIELD OF THE INVENTION

The present invention pertains to the field of light modulation. More particularly, the present invention relates to a two dimensional electro-optic modulator array.

BACKGROUND OF THE INVENTION

Optics is playing a greater and wider role in the fields of electronics, telecommunications, signal processing, and data storage. Light beams are preferable over electrical signals because of its high bandwidth and speed. Rather than using conventional electrical signals, optical based systems employ light beams to convey and process information. In optical based systems, a light source, such as a laser, is modulated to convey the desired information. By implementing digital or analog modulation, the light beam can be used in a wide variety of different applications. Chief among these applications has been the generation of visual displays, optical signal processing, optical digital computing, laser printing, and storage of digital information, etc.

Although lasers can be modulated at rather high frequencies, many applications require even higher data rates. In an effort to increase the data rate, some prior art optical systems have implemented multiple light beams. By processing these multiple light beams in parallel, the overall speed of the system can be dramatically enhanced. Depending on the particular application, the number of light beams can range from tens to perhaps several thousands.

One problem associated with prior art light modulators is that attention was typically directed to maximizing the number of modulator array elements, rather than the element or total array modulation rate. This has resulted in spatial light modulation schemes being accessed by means other than electrically, and typically being slow. The known electrically accessed spatial light modulation schemes, such as liquid crystal displays, are slow optically driven devices using photosensitive materials and serial scanned cathode ray tubes as a means of access.

Another problem with two-dimensional modulator arrays lies in fabrication. If physically large modulators were to be implemented, the size of the packaging would increase several fold. Conversely, small modulator arrays are expensive to produce because of the difficulty in reliably achieving electrical contact between each of the many modulator elements.

Thus, there is a need in the prior art for an efficient method of fabricating a two dimensional array of electro-optic modulators. It would also be preferable if such a fabrication scheme could reliably connect to the various modulator elements.

SUMMARY OF THE INVENTION

The present invention pertains to a two dimensional electro-optic modulator array used in modulating a two-dimensional array of light beams of an optical system. The modulator array is fabricated by stacking together a number of wafers. Each of these wafers has an associated linear array of transversely driven Pockels modulators. These Pockels modulators are formed by placing a plurality of electrodes over a top surface of an optical material and extending the electrodes over a beveled edge of the optical material. A ground plane resides on the bottom surface of the optical material. Conductive end coatings are associated with each of the modulator electrodes with these coatings being either transparent or reflective. In the preferred embodiment end reflectors are used which reflect the light beams back through the wafer. Electrical attachments are connected to the ends of each electrode for controlling the modulation for each electrode. Thereby, separate light beams can individually be modulated.

In one embodiment, the size of the modulator array is minimized by focusing and causing the optical beams to converge upon the conductive end reflectors. In another embodiment, the ground plane on the bottom of one wafer is electrically coupled to the edge of an adjacent wafer for connection purposes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A two dimensional electro-optic modulator array is described. In the following description, for purposes of explanation, numerous specific details are set forth, such as device sizes, materials, ground and electrode connections, optical properties, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

The present invention pertains to a two dimensional array of individual optical polarization switching or modulating elements for use in electro-optic systems such as for multiple beam laser writing or optical computing applications. Described herein is a means of fabricating a linear array of modulator elements on a wafer. Multiple wafers are then stacked to form a two dimensional array of thin transverse electro-optic modulators. In the currently preferred embodiment, each of the modulators utilize the standard Pockels effect. Pockels devices typically consist of a crystal, such as Lithium Tantalate, with polished optical faces for passage of an optical beam in a transverse electric field established between top and bottom electrodes. These devices usually have an optical path length several tens of times larger than the distance between the top and bottom electrodes to minimize the required drive voltage.

Figure 1:
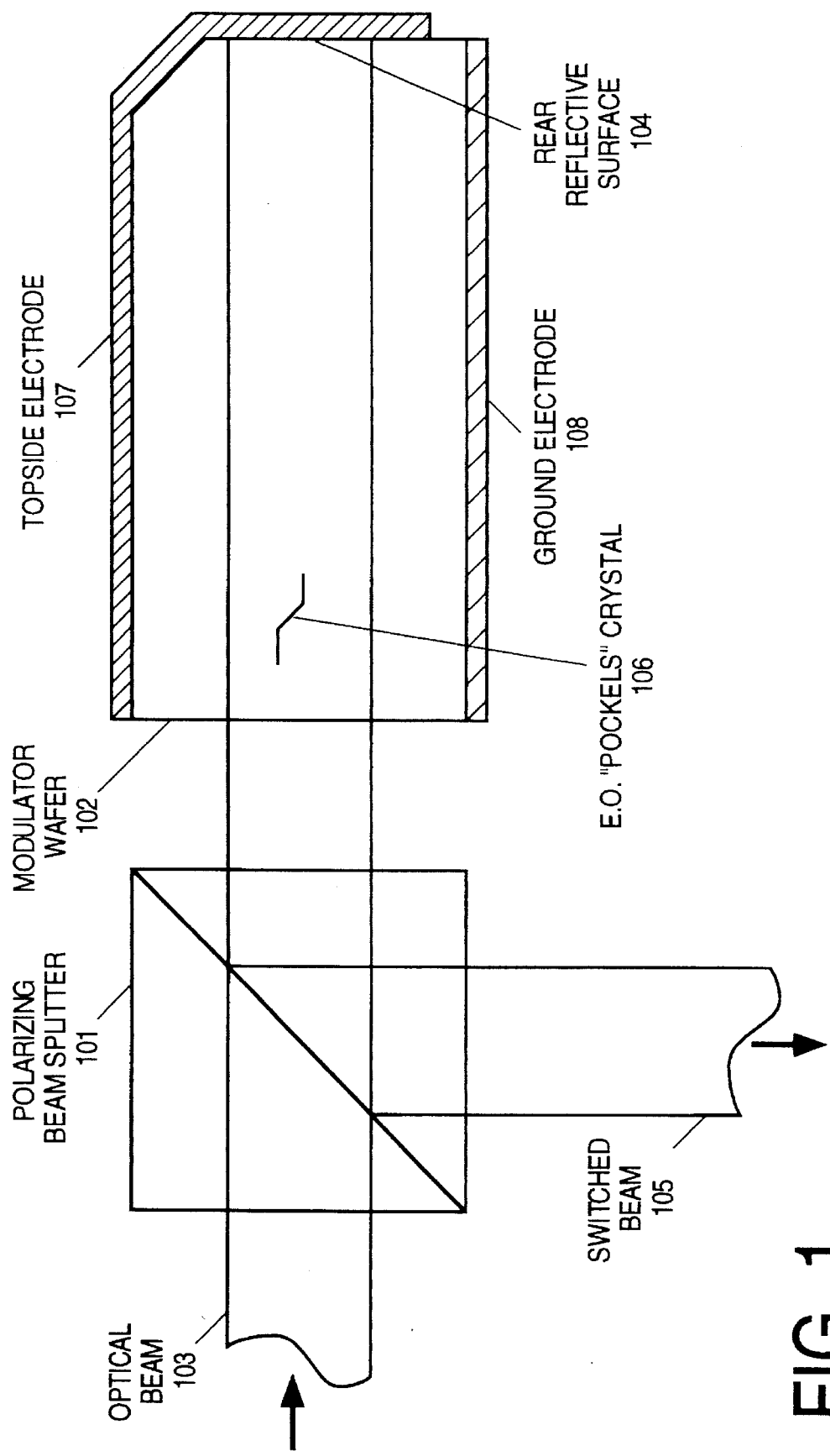
FIG. 1 shows a cross-sectional side view of a beam splitter and a modulator wafer.

One problem encountered with simply fabricating a linear array of modulator elements on several crystalline wafers and then stacking wafers, is the difficulty of achieving electrical contact to the modulator elements associated with the inner layers of the stack. In the present invention, the means to achieve such a contact is implemented in a reflective configuration. FIG. 1 shows a cross-sectional side view of a beam splitter 101 and a modulator wafer 102. An optical beam 103 having an initial polarization passes through beam splitter 101 and transits the modulator wafer twice-once propagating through the element and once after being reflected back by the rear reflective surface 104. The reflected optical beam is switched into a different path 105 by means of the optical polarizing beam splitter 101 after polarization rotation. The modulator wafer 102 is comprised of an electro-optical Pockels crystal 106, a topside electrode 107, and a ground electrode 108. The Pockels crystal 106 can be constructed from crystalline KDP, BaTiO$_3$, LiTaO$_3$ (Lithium Tantalate), or any similar electro-optic material of good optical quality. The Pockels crystal is sandwiched between the topside electrode 107 and the ground electrode 108. Applying an appropriate voltage to electrode 107 produces a modulatable transverse electric field in the Pockels crystal 106. Thereby, optical beam 103 is modulated by this electric field. Thereupon, the modulated optical beam is reflected back towards the beam splitter 101 by the rear reflective surface 104. Pockel's modulation is described in the Handbook of Optics, published by the Optical Society of America.

Figure 2:
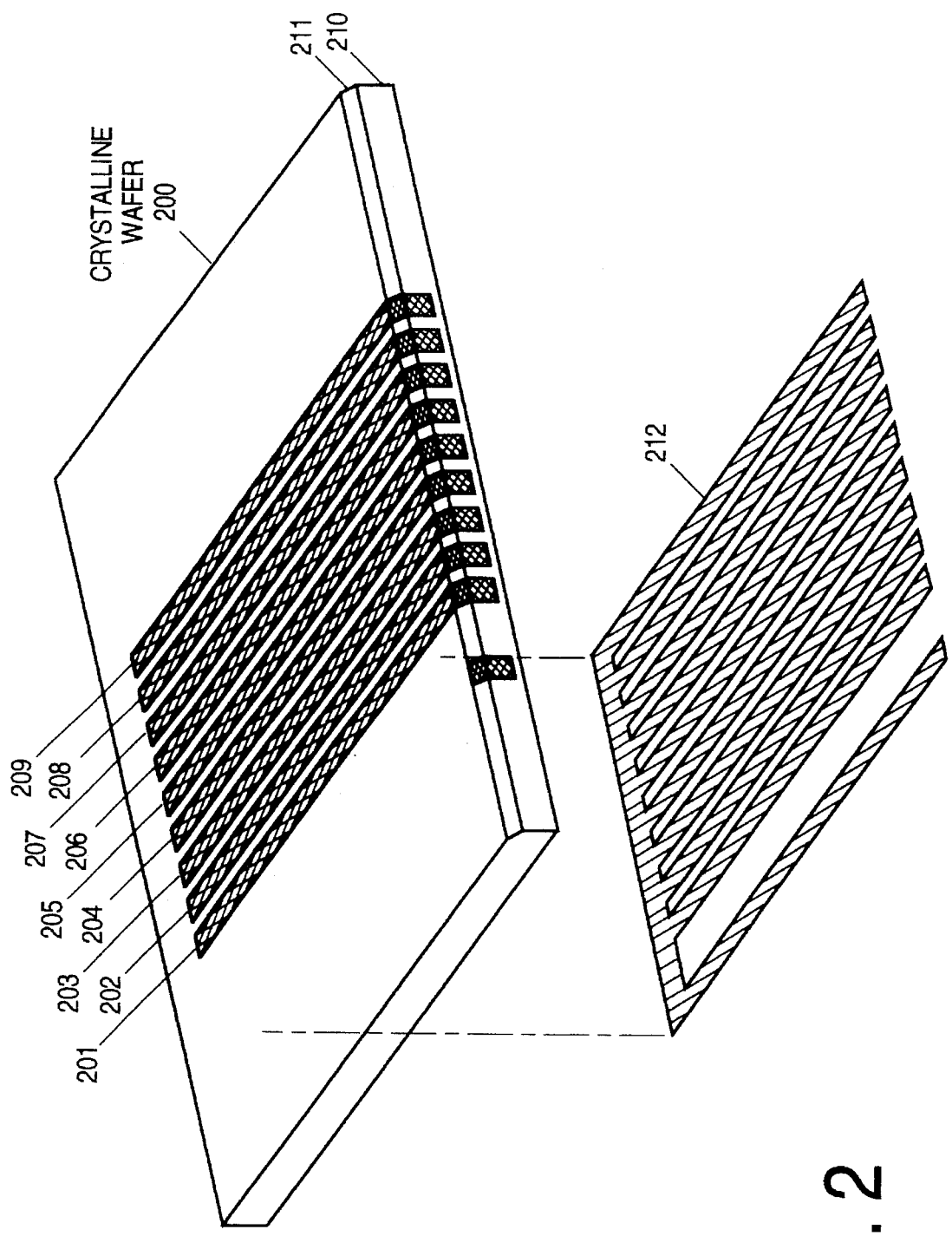
FIG. 2 shows a single crystalline wafer on which is deposited the electrode pattern for nine such modulator elements.

A number of separate modulator elements can be incorporated onto a single wafer. FIG. 2 shows a single crystalline wafer 200 on which is deposited the electrode pattern for nine such modulator elements 201–209. The optical face 210 at the far end of the crystal modulator, remote from the input beam, is coated with a reflective layer. This reflective layer not only returns the input optical beam, but also provides a means of contacting each electrode individually. In the currently preferred embodiment, the reflective layer is fabricated from the same material as that of the electrode. Each of the electrodes 201–209 is continued over the edge of the wafer onto the rear surface 2 10 by means of a bevel plane 211. A ground electrode 2 12 is placed on the bottom surface of wafer 200. Hence, this architecture results in a wafer having a linear array of transversely driven Pockels modulators.

Figures 3A, 3B:
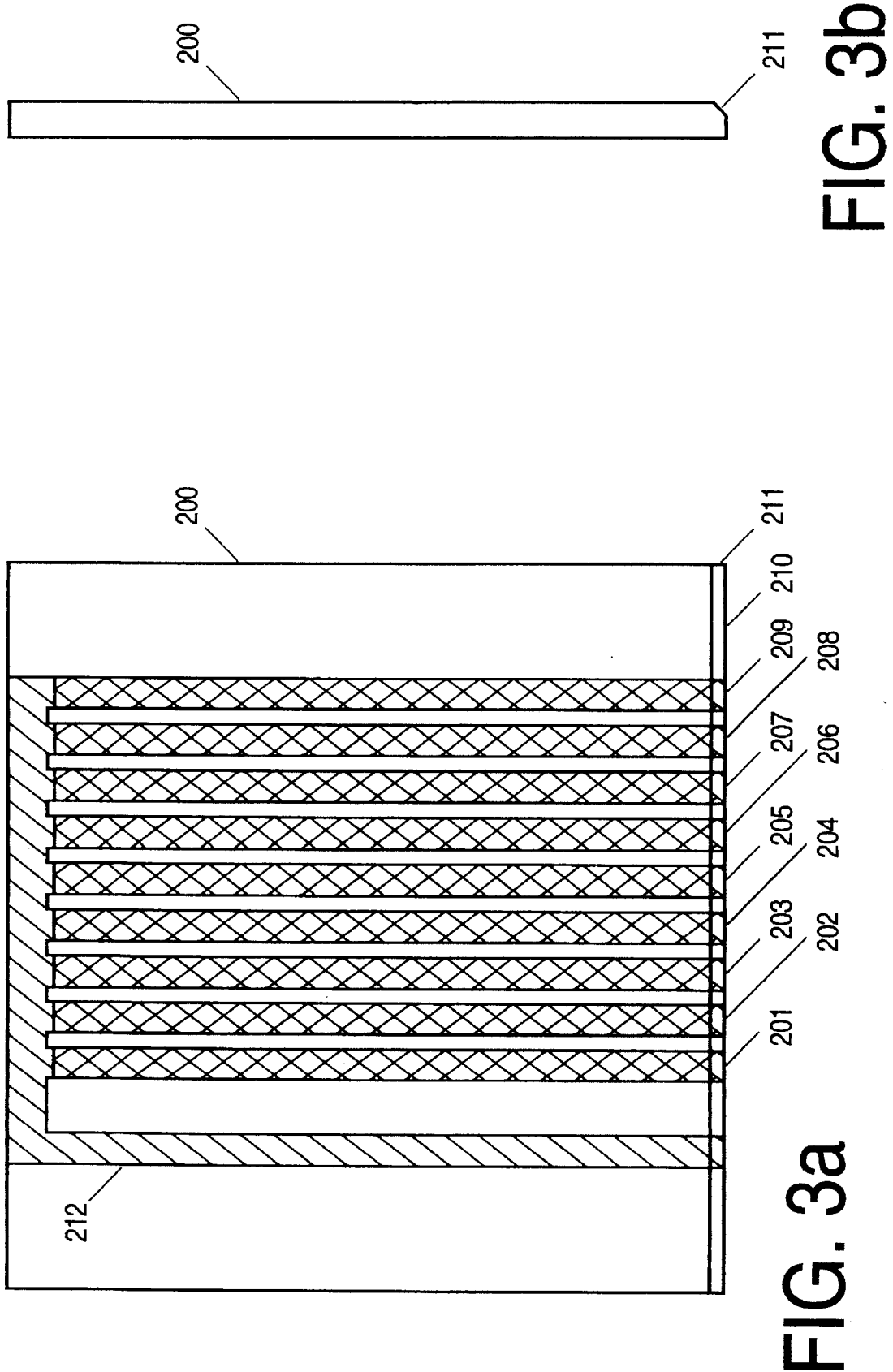
FIG. 3A shows the top view of one embodiment of a modulator wafer.
FIG. 3B shows a side view of one embodiment of the modulator wafer.

FIG. 3A shows the top view of one embodiment of a modulator wafer 200. In the currently preferred embodiment, wafer 200 is comprised of a 5.00×5.00 mm ×0.2 mm Pockels crystal. The top surface contains the control traces associated with the modulation electrodes (e.g., electrodes 201–209). The bottom surface contains the ground traces associated with the ground electrode 212. In the currently preferred embodiment, each of the traces are approximately 0.20 mm wide and are spaced 0.05 mm apart. Note that the top modulation electrodes 201–209 are wrapped to edge 211 via bevel plane 211. FIG. 3B shows a side view of one embodiment of the modulator wafer 200. Note that the edge containing the reflective surface is beveled 211.

Figure 4:
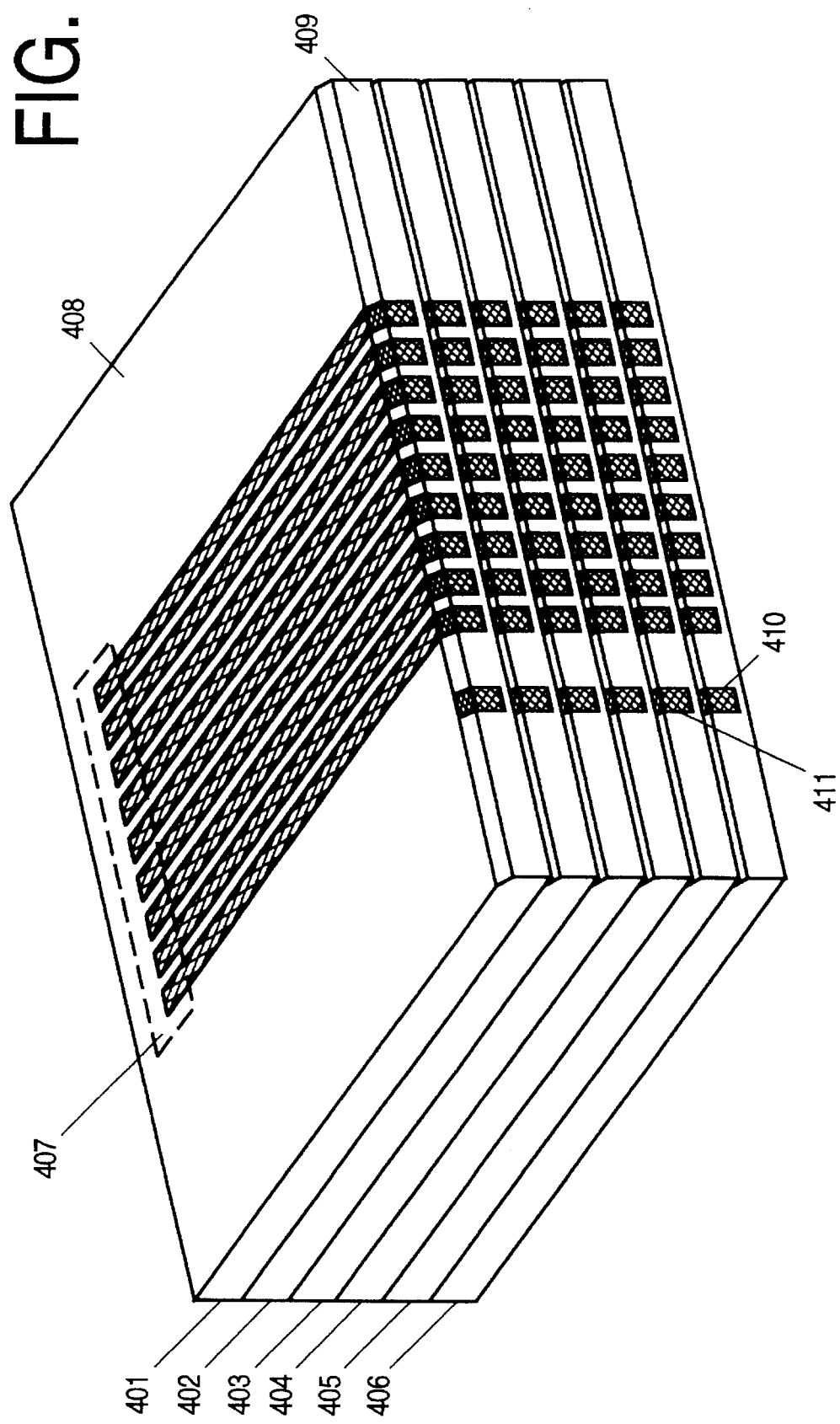
FIG. 4 shows a stacked assembly of modulator wafers.

FIG. 4 shows a stacked assembly of modulator wafers. In this embodiment, six modulator wafers 401–406 are shown stacked one on top of another. Each of the wafer layers 401–406 have a corresponding set of electrodes residing on one surface and overlapping an edge of that wafer. For example, wafer 401 has a set of electrodes 407, which resides on surface 408 and overlaps edge 409. The external connections for controlling the electrodes are electrically attached to the edge regions of the electrodes. In the currently preferred embodiment, each wafer also has a ground plane residing on the other surface. These ground planes are connected via the edge connectors associated with an adjacent wafer. For example, edge connector 410 of wafer 406 is used to connect the ground plane residing on the bottom surface of wafer 05. Similarly, edge connector 411 of wafer 405 is used to provide an electrical connection to the ground plane residing on the bottom surface of wafer 404. Each individual modulator element is contacted on the rear face of a stack of wafers. Electrical attachments are made at the end of each individual element. Electrical connection to this planar array of contacts can be implemented in numerous different ways, such as by individual wire bonding, by soldering to contacts on a flexible connector, or by reflow of solder connections on a rigid connecting material. Note that the ground connection to each wafer is made in a similar manner by connecting the electrodes from one wafer to the adjacent wafer rear face after assembly of the stack. This eliminates the need to bevel both edges of each wafer. In other words, the ground plane attachment for one of the wafers can be achieved by using the end of an adjacent wafer for connection. Thus, a two-dimensional array of electro-optic modulators utilizing a "double pass" reflective mode with a reflective end reflector connected to each transverse electrode is fabricated.

In the currently preferred embodiment, the device is an array of 5×9 independent modulators fabricated on a Lithium Tantalate crystal. Lithium Tantalate has a half wave voltage of approximately 3,500 volts at 0.83 micron wavelength. Hence, a device having a 50:1 optical aspect ratio nominally requires a 70 volt drive to provide the half wave retardation necessary for a ninety degree beam polarization rotation. A typical device size is a 0.2 mm thick wafer with 0.2 mm wide ×5 mm long electrodes on 0.25 mm centers. The device is reflective at one end so as to give double optical pass. Hence, the mechanical length is approximately 25 times the thickness and half the optical length. The reflective nature of the device also allows a slowly converging optical beam to be focused onto the rear reflective surface, thereby permitting smaller devices. A single lens may be utilized to provide for the convergence of a two-dimensional array of optical beams to become focused onto a stack of modulators. The stacked assembly device operates at 70 v and has approximately a 17–20 db switched contrast ratio, inter channel cross talk at–20 db or less, and rise and fall times of under 100 nanoseconds. The assembled array modulator is mounted in a chip carrier.

To maintain the optical alignment between each modulation element of the two dimensional array, the top electrode and ground plane connections are deposited over the beveled edge. The front and rear optical faces are then polished flat and parallel. The rear electrode pattern is then deposited connecting to each electrode and ground plane. The optical surfaces may or may not be antireflection coated. The ground electrode for each wafer may be electrically isolated from the active electrode of the adjacent wafer by means of a thin insulating layer either deposited or simply positioned and bonded in place as would be a thin plastic sheet. Alternatively, the ground electrode of each modulator element can be fashioned to exactly match and connect to the active layer immediately adjacent, in which case the voltage applied to the modulator is determined by the state of the adjacent modulator. For example, an 'all activated' column stack of modulators in the array would require a sequence of alternating voltages. Conversely, an 'unactivated' modulator would require the two adjacent voltages in the column to be the same. Thus, an apparatus and method for independent and high speed modulation of either a one or a two dimensional beam array is disclosed.

What is claimed is:

1. An electro-optic modulator for modulating a two-dimensional array of light beams comprising:

a plurality of wafer layers having a top surface, a bottom surface, and an edge common to said top surface and said bottom surface, wherein a first wafer layer is stacked on top of a second wafer layer;

a plurality of modulation electrodes associated with each of said wafer layers for independently modulating light beams of said array of light beams, wherein said modulation electrodes reside on said top surface and said edge of one of said wafer layers;

a plurality of ground planes residing on said bottom surface of one of said wafer layers; and a conductive end reflector coupled to each of said modulator electrodes for reflecting said light beams back through said wafer layers, wherein an optical beam is converged and focused onto said conductive end reflector.

2. An electro-optic modulator for modulating a two-dimensional array of light beams comprising:

a plurality of wafer layers having a top surface, a bottom surface, and an edge common to said top surface and said bottom surface, wherein a first wafer layer is stacked on top of a second wafer layer;

a plurality of modulation electrodes associated with each of said wafer layers for independently modulating light beams of said array of light beams, wherein said modulation electrodes reside on said top surface and said edge of one of said wafer layers;

a plurality of ground planes residing on said bottom surface of one of said wafer layers; and a beveled plane interposed between said top surface and said edge.

3. A two-dimensional modulator array for modulating a plurality of light beams, comprising:

a first wafer layer having a first linear array of transversely driven Pockels modulators comprised of:
an optical material having a first surface and a second surface;
a plurality of electrodes residing on said first surface of said optical material;
a ground plane residing on said second surface of said optical material; and
a plurality of conductive reflectors coupled to said electrodes for reflecting light beams back through said modulator array, wherein said light beams are converged and focused onto said conductive reflectors; and a second wafer layer adjacent to said first wafer layer having a second linear array of transversely driven Pockels modulators.

4. The two-dimensional modulator array of claim 3 further comprising a conductor connected to each of said conductive reflectors for controlling said electrodes.

* * * * *